(12) United States Patent
Barlog

(10) Patent No.: US 9,482,278 B2
(45) Date of Patent: Nov. 1, 2016

(54) COST EFFECTIVE HIGH THRUST CAPACITY TURBOCHARGER ASSEMBLY

(75) Inventor: Daniel J. Barlog, DeMotte, IN (US)

(73) Assignee: Precision Turbo & Engine Rebuilders, Inc., Hebron, IN (US)

( * ) Notice: Subject to any disclaimer, the term of this patent is extended or adjusted under 35 U.S.C. 154(b) by 1296 days.

(21) Appl. No.: 13/325,831

(22) Filed: Dec. 14, 2011

(65) Prior Publication Data

US 2013/0156552 A1    Jun. 20, 2013

(51) Int. Cl.

| | | |
|---|---|---|
| *F04D 29/04* | (2006.01) |
| *B21D 53/10* | (2006.01) |
| *F16C 21/00* | (2006.01) |
| *F16C 33/32* | (2006.01) |
| *F04D 25/02* | (2006.01) |
| *F04D 29/051* | (2006.01) |
| *F04D 29/059* | (2006.01) |
| *F16C 19/54* | (2006.01) |
| *F16C 33/56* | (2006.01) |
| *F16C 33/62* | (2006.01) |

(52) U.S. Cl.
CPC .............. *F16C 33/32* (2013.01); *F04D 25/024* (2013.01); *F04D 29/051* (2013.01); *F04D 29/059* (2013.01); *F16C 19/543* (2013.01); *F16C 21/00* (2013.01); *F16C 33/56* (2013.01); *F16C 33/62* (2013.01); *Y10T 29/49696* (2015.01)

(58) Field of Classification Search
CPC F16C 2360/24; F16C 19/548; F16C 19/547; F16C 17/00; F16C 17/02; F16C 17/10; F16C 19/181; F16C 19/182; F16C 19/183; F16C 19/184; F16C 19/546; F02C 6/12; F05D 2220/40; F04D 29/056
See application file for complete search history.

(56) References Cited

U.S. PATENT DOCUMENTS

| | | | | |
|---|---|---|---|---|
| 3,993,370 | A | * | 11/1976 | Woollenweber ...... F01D 25/166 384/287 |
| 4,641,977 | A | | 2/1987 | Woollenweber |
| 4,798,523 | A | | 1/1989 | Glaser |
| 5,522,667 | A | * | 6/1996 | Miyake ......................... 384/492 |
| 5,967,762 | A | | 10/1999 | Keller |
| 6,220,829 | B1 | | 4/2001 | Thompson |
| 6,478,553 | B1 | * | 11/2002 | Panos et al. ................... 417/407 |
| 6,814,537 | B2 | * | 11/2004 | Olsen ............................ 415/111 |
| 6,877,901 | B2 | | 4/2005 | Wollenweber |
| 7,214,037 | B2 | | 5/2007 | Mavrosakis |
| 7,677,041 | B2 | * | 3/2010 | Woollenweber ................ 60/608 |
| 2008/0083396 | A1 | * | 4/2008 | Ueno et al. ................. 123/559.1 |

* cited by examiner

*Primary Examiner* — Dwayne J White
*Assistant Examiner* — Julian Getachew
(74) *Attorney, Agent, or Firm* — Ice Miller LLP

(57) ABSTRACT

An assembly for a turbocharger and methods for creating the same are disclosed. Such assembly for a turbocharger includes a bearing housing having first and second bore ends, a housing cavity, and a bearing assembly disposed within the housing cavity. The bearing assembly includes an annular rotating journal positioned at the first bore end and first and second angular contact bearings positioned at the second bore end, where the first and second angular contact bearings resist axial loads in opposite directions. The bearing housing and bearing assembly are configured to receive a shaft and together dampen axial and radial loads in all directions from the shaft.

15 Claims, 12 Drawing Sheets

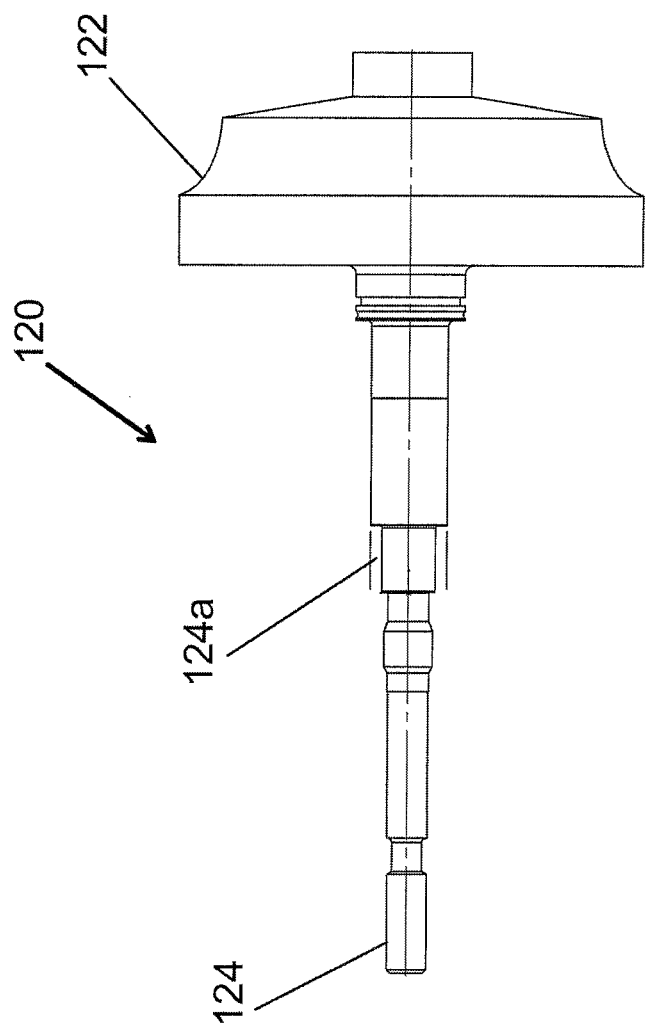

COST EFFECTIVE HIGH THRUST CAPACITY TURBOCHARGER ASSEMBLY

BACKGROUND

For many years, turbochargers have been widely used in internal combustion engines. By harnessing the flow of hot exhaust gas exiting an engine's combustion chamber, turbochargers are able to improve the engine's volumetric efficiency. Turbochargers, as well as other types of turbomachinery, generally require vibration damping and thrust load provisions to accommodate their components that rotate at high angular velocity.

Typically, a bearing system is provided in a turbocharger for vibration damping and accommodating thrust loads. For example, bearing systems are typically located adjacent the rotor shaft of turbomachinery to dampen vibrations of the shaft. Where rotor shaft speeds and external influences on shaft motion are high, the ability to effectively dampen the rotor shaft has a close relationship to the performance of the engine as a whole. In addition to dampen vibrations of the rotor shaft, an effective bearing system must be able to handle axial thrust loads imposed on the rotating assembly of the turbocharger by the compressor and turbine wheels. Furthermore, the bearing system must also be able to operate in view of thermal loading of the assembly due to the very hot exhaust gases exiting the engine combustion chamber via the turbine wheel. Without damping and thrust provisions, a rotor shaft would transmit forces through the turbomachinery that would limit the performance of the engine, as well as cause noise, fretting, loosening of joints, and reduced service life of the turbomachinery as a whole and its individual parts.

Modern engines typically run at high pressure ratios that create shaft vibrations and thrust loads that common, inexpensive bearings (e.g., convention journal and thrust bearings) within existing turbochargers typically are not able to dampen. Also, most bearings are not very effective within existing turbochargers because they are not able to resist the high heat. Premium bearings, such as hybrid ceramic ball bearings, are able to withstand the vibrations and loads created by modern engines. The premium bearings are also able to tolerate exposure to high heat. However, the cost of utilizing premium bearings is prohibitive for most applications.

Accordingly, there exists a need for a turbocharger with a bearing system having a high thrust capacity that is cost effective.

SUMMARY

The present disclosure discloses an assembly for a turbocharger and methods of making the same.

In one embodiment of the present disclosure, an assembly for a turbocharger includes a bearing housing. The bearing housing includes a substantially cylindrical bore having a longitudinal axis, a first bore end, a second bore end, and a housing cavity extending through the bearing housing between the two ends. The turbocharger assembly also includes a bearing assembly that is disposed within the housing cavity. The bearing assembly includes an annular rotating journal bearing positioned concentrically within the housing cavity adjacent the first bore end. The bearing assembly also includes a first angular contact bearing positioned concentrically within the housing cavity adjacent the second bore end. The first angular contact bearing includes a first bearing outer race and a first bearing inner race, where the first bearing outer race and the first bearing inner race are configured to accommodate a plurality of first bearing elements between the races and to resist axial loads in a first direction along the longitudinal axis of the bearing housing. The bearing assembly also includes a second angular contact bearing positioned concentrically within the housing cavity adjacent the first angular contact bearing. The second angular contact bearing includes a second bearing outer race and a second bearing inner race, where the second bearing outer race and the second bearing inner race are configured to accommodate a plurality of second bearing elements between the races and to resist axial loads in a second direction along the longitudinal axis of the bearing housing. The second axial loading direction is opposite the first direction. The bearing housing and bearing assembly are configured to receive a shaft and operate together to together dampen axial and radial loads in all directions from said shaft.

In another embodiment of the present disclosure, a method of creating an assembly of a turbocharger for resisting loads caused by a shaft of the turbocharger includes the steps of providing the bearing housing and placing an annular journal bearing within the housing cavity adjacent to the first bore end and placing a first angular contact bearing within the housing cavity adjacent to the second bore end. The method further includes placing a second angular contact bearing within the housing cavity adjacent to the first angular contact bearing such the first and second angular contact bearings are opposing to each other. The method also includes the step of placing a bearing retainer plate and a seal collar adjacent the second bore end of the bearing housing such that the first and second angular contact bearings are at least partially retained within the housing cavity of the bearing housing by the bearing housing, the bearing retainer plate, and the seal collar.

In another embodiment of the present disclosure, a method of improving an existing journal bearing turbocharger includes the step of providing a journal bearing turbocharger where the journal bearing turbocharger includes the bearing housing as described above, a rotating shaft extending longitudinally through the bearing housing and comprising a turbine at the first bore end and a compressor at the second bore end, and a first annular journal bearing positioned within the housing cavity adjacent to the first bore end. The journal bearing turbocharger also includes a thrust bearing positioned within the housing cavity adjacent to the second bore end, a second annular journal bearing positioned within the housing cavity between the first annular journal bearing and the thrust bearing, a thrust washer positioned within the housing cavity in contact with the thrust bearing and between the thrust bearing and the second annular journal bearing, and a seal collar positioned adjacent the second bore end of the bearing housing such that the first and second angular contact bearings are retained within the housing cavity of the bearing housing by the bearing housing, the bearing retainer plate, and the seal collar.

The method also includes the step of removing the thrust bearing, the second annular journal bearing, and the thrust washer from the journal bearing turbocharger. The method further includes the step of modifying the bearing housing, the rotating shaft, and the seal collar such that a first angular contact bearing, a second angular contact bearing, a bearing sleeve, and a bearing retainer plate may be positioned within the turbocharger where the thrust bearing, second annular journal bearing, and thrust washer were previously positioned in the turbocharger, wherein each of the first and second angular contact bearings comprise metallic or plastic ball bearings. The method additionally includes the steps of placing the first angular contact bearing within the bearing sleeve placing the second angular contact bearing within the bearing sleeve adjacent to the first angular contact bearing such the first and second angular contact bearings oppose each other, placing the bearing sleeve within the bearing housing adjacent to the second bore end, and placing the bearing retainer plate adjacent the second bore end of the bearing housing such that the first and second angular contact bearings are at least partially retained within the housing cavity of the bearing housing. The method also includes the step of placing the seal collar adjacent the bearing retainer plate adjacent the second bore end of the bearing housing such that the first and second angular contact bearings are at least partially retained within the housing cavity of the bearing housing by the bearing housing, the bearing retainer plate, and the seal collar.

BRIEF DESCRIPTION OF THE DRAWINGS

The above mentioned embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 3 shows a side view of a modified turbine, according to at least one embodiment of the present disclosure;

DETAILED DESCRIPTION

Figure 1:
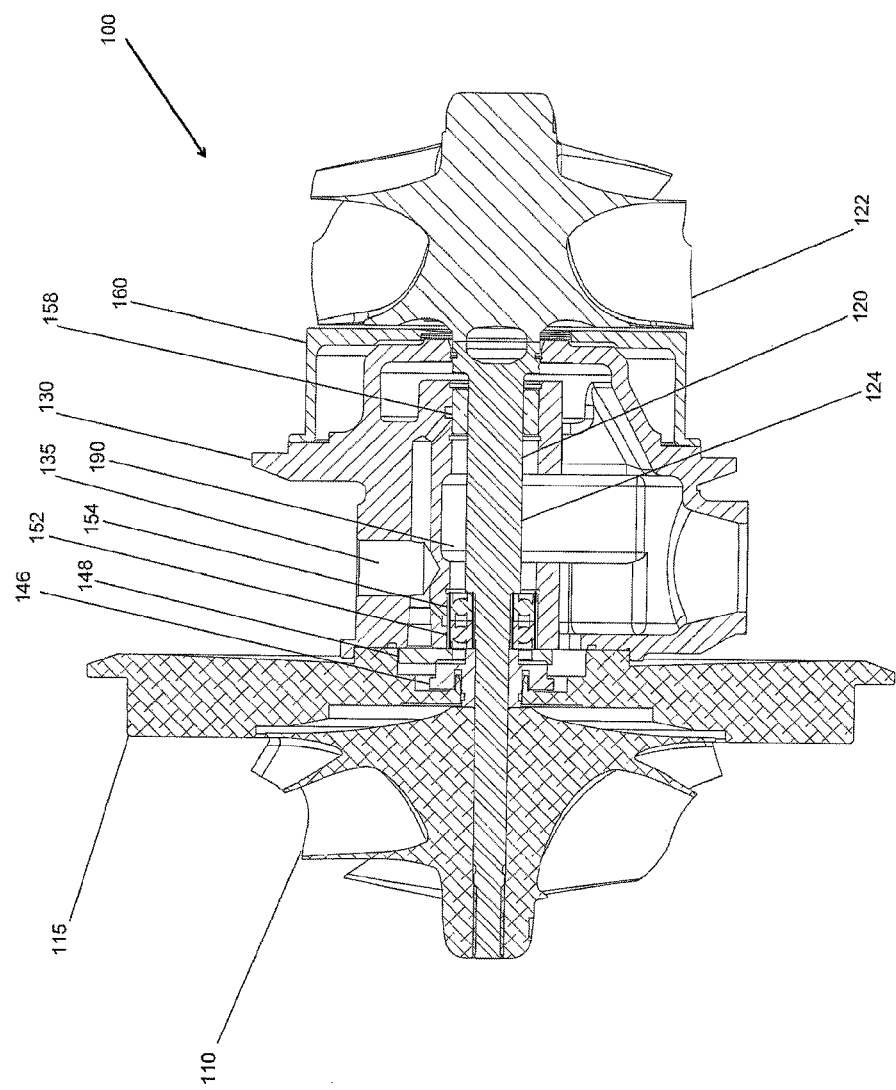
FIG. 1 shows a cross-sectional view of a cost effective high thrust capacity turbocharger assembly, according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a cross-sectional view of an exemplary embodiment of a turbocharger assembly 100 according to the present disclosure. The turbocharger assembly 100 in FIG. 1 includes a bearing housing 130, annular journal bearing 158, a first angular contact bearing 152, and a second angular contact bearing 154. As shown in FIG. 1, the turbocharger assembly 100 may further include a turbine 120, a heat shroud 160, a backing plate 115, a seal collar 146, a bearing retainer plate 148, and a compressor wheel 110 and may further include a bearing sleeve 156 (not shown). Collectively, the annular journal bearing 158 and first and second angular contact bearing 152, 154 are referred to herein as the bearing system. As shown in FIG. 1, the annular journal bearing 158 is positioned at one end of the bearing housing 130, and the first and second angular contact bearings 152, 154 are positioned at the opposite end of the bearing housing 130. In FIG. 1, a turbine shaft is shown received within an assembly 100. According to the present disclosure, the bearing system substantially maintains the turbine shaft 124 desired spatial parameters despite the thrust loads and rotation of the turbine 120. The ability of the bearing system (in cooperation with other parts of the assembly 100) to control the movement of the turbine shaft 124 is directly related to properly maintaining the alignment of the turbine shaft 124, which affects the performance of the turbocharger, and to critically reducing the rate at which the turbine shaft 124 and other parts of the turbocharger assembly 100 wear.

Figure 2B:
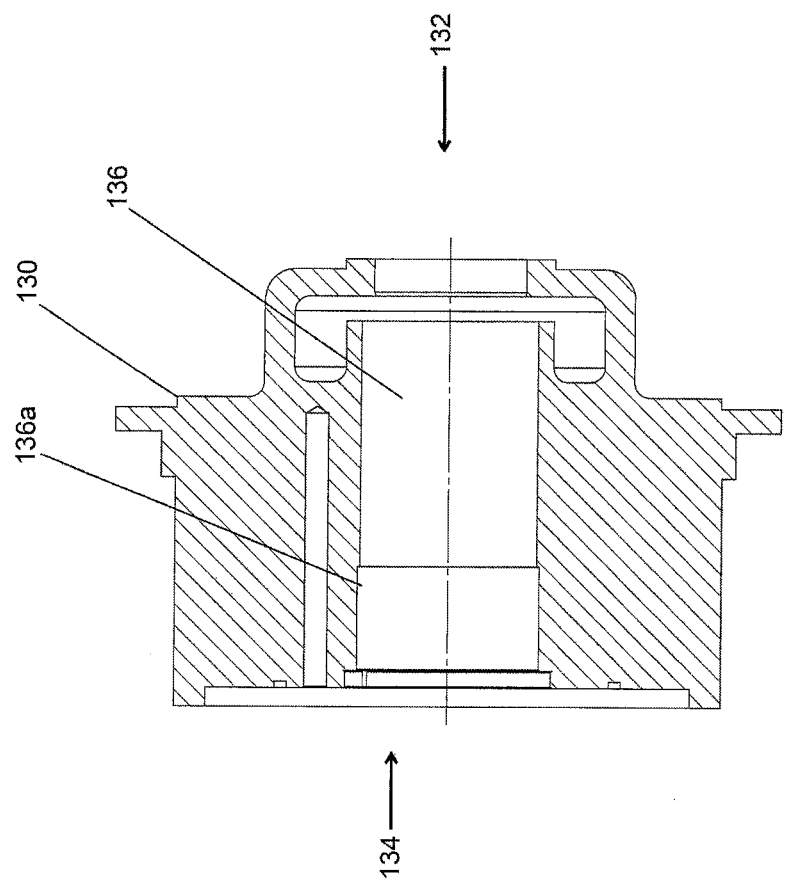
FIGS. 2A and 2B show axial and cross-sectional views of a modified bearing housing, according to at least one embodiment of the present disclosure.
Figure 2A:
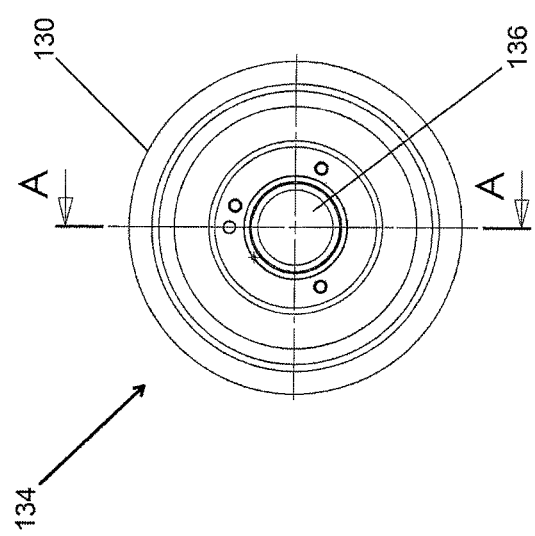

FIGS. 2A and 2B show the housing 130 of the turbocharger assembly 100 according to at least one embodiment the present disclosure. As shown in FIGS. 2A and 2B, the housing 130 is a substantially cylindrical bore having a first bore end 132, a second bore end 134, and a housing cavity 136 that extends through the housing 130 between the bore ends 132, 134. The housing cavity 136 is configured to receive various components of the turbocharger assembly 100, including, but not limited to, the annular journal bearing 158 and the first and second angular contact bearings 152, 154.

One significant cost driver for a turbocharger is thermal loading during operation. The first bore end 132 of the housing 130 is exposed to extremely high thermal loads during operation of the turbocharger 100 due to the hot engine exhaust gases passing through the turbine fan 122. On the other hand, the second bore end 134 is relatively cool during operation because its temperature is affected mostly by ambient air passing through the compressor 110. Existing turbochargers are configured with bearings positioned at the first bore end 132. Therefore, existing conventional turbochargers require expensive, high heat resistant, bearings. In contrast, the present disclosure can utilize an inexpensive annular journal bearing 158 nearest the hot first bore end 132, while fully supporting the turbine shaft 124 at the second bore end 134 with relatively inexpensive opposing angular contact bearings 152, 154. The result is a turbocharger that is reliable, durable, and cost-effective when compared to existing systems.

The housing 130 depicted in FIGS. 1, 2A, and 2B is just one example of the housing that can be used for turbocharger system 100. The bearing housing 130 may be various sizes and shapes. The dimensions of the housing 130 may be designed based upon the desired performance of the system, size of other components, and the like. For example, the housing cavity 136 may vary in diameter along the longitudinal axis of the housing cavity 136, such that the housing cavity 136 may have a diameter of about 34.54 millimeters (mm) (1.360 inches (in.)) at first bore end 132 and a diameter of about 43.05 mm (1.695 in.) at the second bore end 134. Furthermore, the housing 130 may be formed of various materials, including, but not limited to, steel, aluminum, iron, and the like.

As shown in FIG. 1, the annular journal bearing 158, first angular contact bearing 152, and second angular contact bearing 154 are mounted within the housing cavity 136 of the housing 130. In FIG. 1, the annular journal bearing 158 is positioned adjacent to the first bore end 132, while the first and second angular contact bearings 152, 154 are disposed adjacent the second bore end 134 within the cavity 136. Alternatively, a bearing sleeve 156 may be positioned within the housing cavity 136, disposed adjacent the second bore end 134, and substantially centered on the longitudinal axis of the housing 130 such that the bearing sleeve 156 is substantially aligned with the housing cavity 136. In this alternative configuration, the first and second angular contact bearings 152, 154 are positioned within the bearing sleeve 156.

Figure 4B:
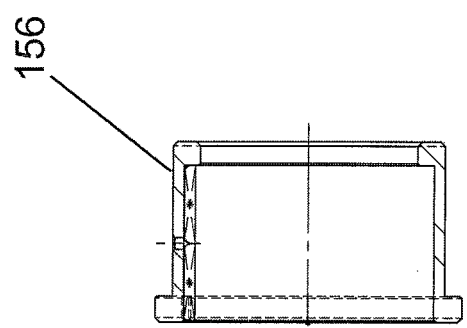
FIGS. 4A and 4B show axial and cross-sectional views of a bearing sleeve, according to at least one embodiment of the present disclosure.
Figure 4A:
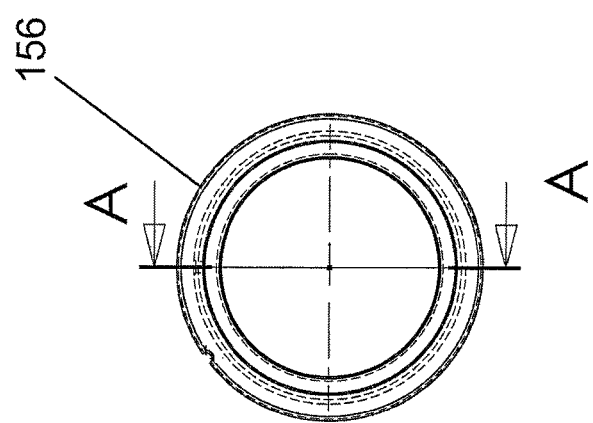

As shown in FIGS. 4A and 4B, the bearing sleeve 156 may be held fixed relative to the housing 130 such that the bearing sleeve 156 and housing 130 do not move relative to one another, while the first and second angular contact bearings 152, 154 may be permitted to move and rotate relative to the housing 130 and bearing sleeve 156. Furthermore, the annular journal bearing 158 may be mounted within the housing cavity 136 such that the journal bearing 158 may move and be able to rotate relative to the housing 130.

The bearing system, which resides within the bearing housing 130, is configured to support the turbine shaft 124. As shown in FIG. 3, the turbine 120 includes a turbine wheel 122 and a turbine shaft 124, which is substantially cylindrical and may have a varying diameter along sections of its axial length. The turbine shaft 124 of the turbine 120 is configured to pass through the heat shroud 160, the housing 130, the bearing system, the backing plate 115, and the compressor wheel 110 from one end of the turbocharger assembly 100 to the other. The heat shroud 160 is typically disposed between the turbine wheel 122 and the housing 130, which contains, supports, and lubricates the bearing system. The backing plate 115 is configured to cap and seal the housing 130 and can be disposed between the housing 130 and the compressor wheel 110, which is fixed to the turbine shaft 124 at the opposite end of the shaft 124 from the turbine wheel 122.

As shown in FIG. 1, the bearing retainer plate 148 and seal collar 146 are configured to cap the housing 130 and are positioned adjacent its second bore end 134. The bearing retainer plate 148 may be positioned concentrically around the shaft and interposed between the first angular contact bearing 152 and the seal collar 146 with an axially-facing surface in contact with an adjacent axial surface of the first outer race 152a for transmitting an axial thrust load to the bearing housing 130. The seal collar 146 may be positioned concentrically around the shaft and interposed between the bearing retainer plate 148 and the backing plate 115 with an axially-facing surface in contact with an adjacent axial surface of the first inner race 152b for transmitting an axial thrust load to the bearing housing 130. In conjunction with the housing 130, the bearing retainer plate 148 and seal collar 146 at least partially retain the first and second angular contact bearings 152, 154 within the housing cavity 136 or alternatively within the bearing sleeve 156 and, thereby, within the housing cavity 136.

Figure 5:
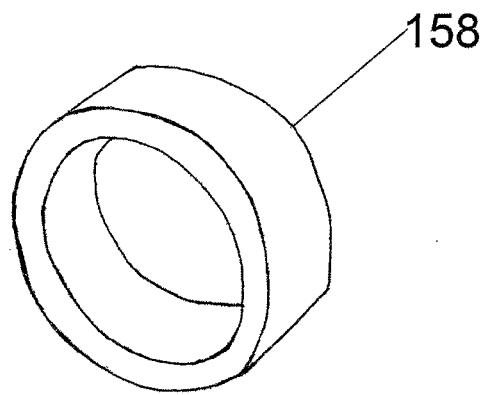
FIG. 5 shows an isometric view of an annular journal bearing, according to at least one embodiment of the present disclosure.
Figure 6C:
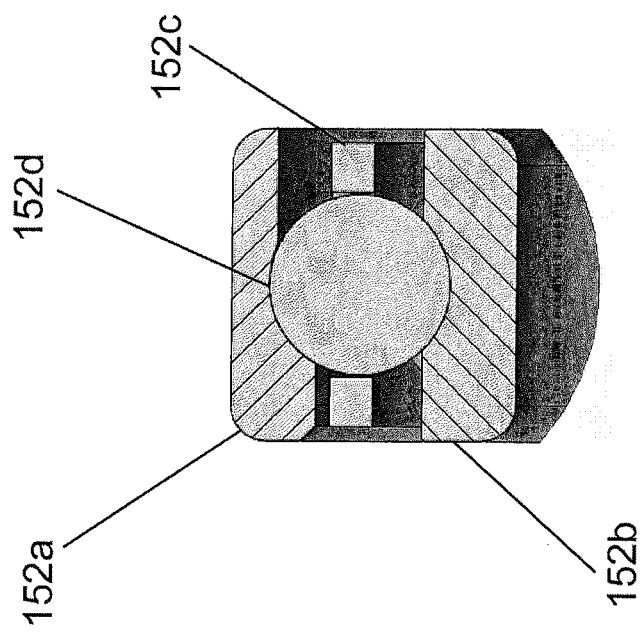
FIGS. 6A, 6B and 6C show axial, cross-sectional, and detailed views of an angular contact bearing, according to at least one embodiment of the present disclosure.
Figure 6B:
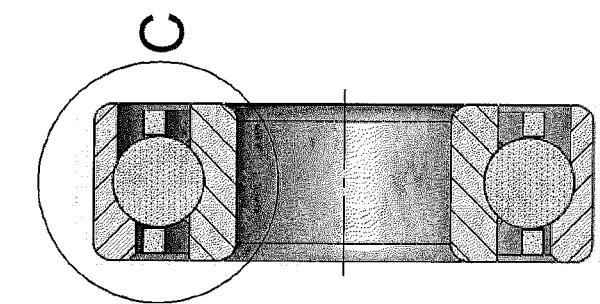
Figure 6A:
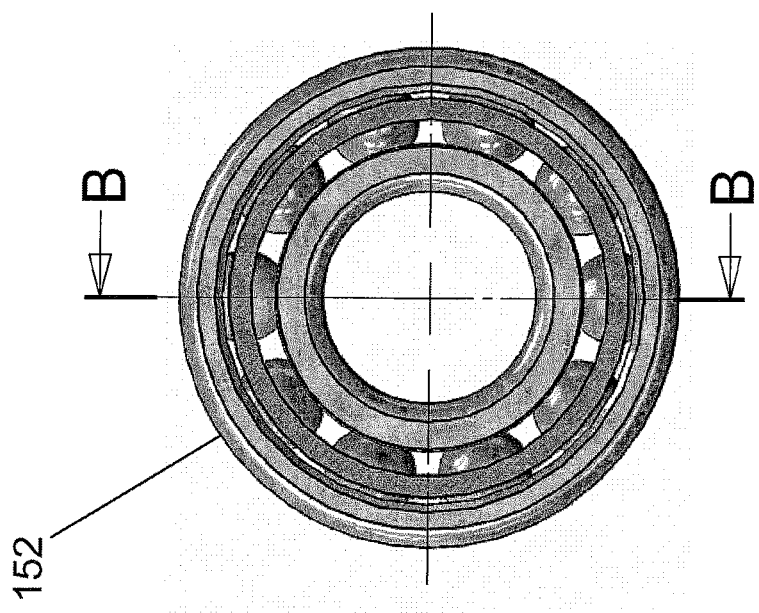

The annular journal bearing 158 and the angular contact bearings 152, 154 may be standard production, commonly referred to as "off-the-shelf," bearings. An exemplary standard production annular journal bearing is shown in FIG. 5. FIGS. 6A-6C show a standard production first angular contact bearing 152 according to at least one embodiment of the present disclosure. FIG. 6A shows an axial view of the first angular contact bearing 152, while FIG. 6B shows a cross-sectional view of the first angular contact bearing 152 of FIG. 6A along section A-A. FIG. 6C provides a detailed cross-sectional view. Exemplary standard production angular contact bearings include 7202 size bearings manufactured by such companies as SKF™ and Timken,™ which have typical dimensions of 15 mm (0.59 in.) bore diameter, 35 mm (1.38 in.) outer diameter, and 11 mm (0.43 in.) width. In at least one alternative embodiment, the standard production angular contact bearings may include 100 size bearings, which have typical dimensions of 10 mm (0.39 in.) bore diameter, 26 mm (1.02 in.) outer diameter, and 8 mm (0.31 in.) width. While FIGS. 6A-6C illustrate one example of the first angular contact bearing 152, it should be noted that the second angular contact bearing 154 may have the same structure. As shown in FIG. 6C, the first angular contact bearing 152 includes an outer race 152a, an inner race 152b, a retainer ring 152c, and a plurality of ball bearings 152d. The inner race 152b receives and supports the turbine shaft 124, and the outer race 152a is positioned around the inner race 152b, such that inner race 152b has a smaller diameter than outer race 152a. It should be noted that the inner race and outer race can have diameters of any size so long as the inner race has a smaller diameter than the outer race. In one embodiment according to the present disclosure, the inner race 152b has a diameter of about 10.2 mm (0.4 in.) and the outer race 152a has a diameter of about 28.4 mm (1.12 in.). The outer and inner races 152a, 152b may be formed of various materials including, but not limited to, steel, tool steel, stainless steel, aluminum, plastic, and the like.

As shown in FIG. 6B, the plurality of ball bearings 152d maintain a separation between the outer and inner races 152a, 152b and are configured to withstand loads transferred from the inner race 152b to the outer race 152a. For example, as the turbine shaft 124 moves and rotates, it interacts with the inner race 152b causing the inner race 152b to rotate and move. The plurality of ball bearings 152d in the angular contact bearing 152 transfer this movement and rotation to the outer race 152a, which transfers its load to the housing 130. As described below, the relative movement, rotation, and interaction between the components is dampened by a lubricating fluid interposed between the components.

One may appreciate that any number of ball bearings 152d may be used. The number of ball bearings 152d used in the angular contact bearing 152 typically may be based upon the dimensions of the ball bearings 152d and the other components, such as the bearing sleeve 156. While any suitably sized bearing may be used, bearings of about 7.87 mm (0.31 in.) can be used in at least one embodiment. The plurality of ball bearings 152d may be equidistant from one another or evenly spaced between the outer and inner races 152a, 152b. In order to maintain the desired spacing between ball bearings 152d, the first angular contact bearing 152 may include a retainer ring 152c as shown in FIG. 6B. The plurality of ball bearings 152d may be formed of steel, stainless steel, chrome steel, plastic, silicon nitride, ceramic, hybrid ceramic, or other material with suitable strength, surface, and wear properties.

Figure 7A:
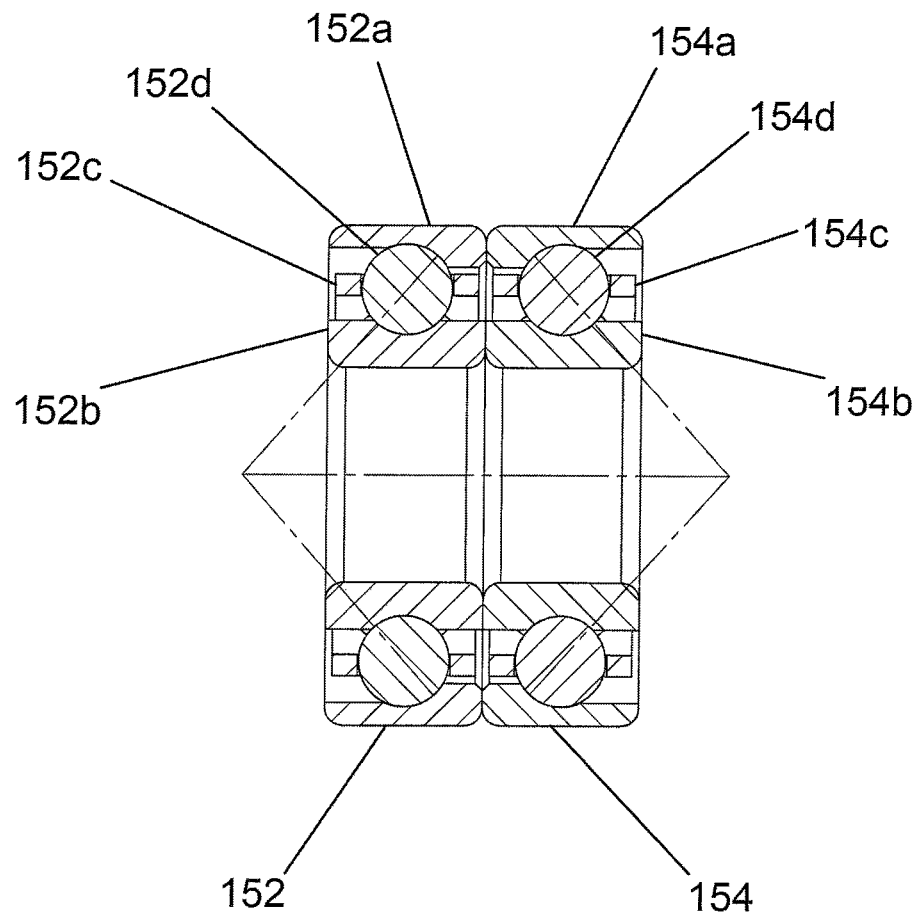
FIGS. 7A and 7B show cross-sectional views of opposed angular contact bearings, according to at least one embodiment of the present disclosure.
Figure 7B:
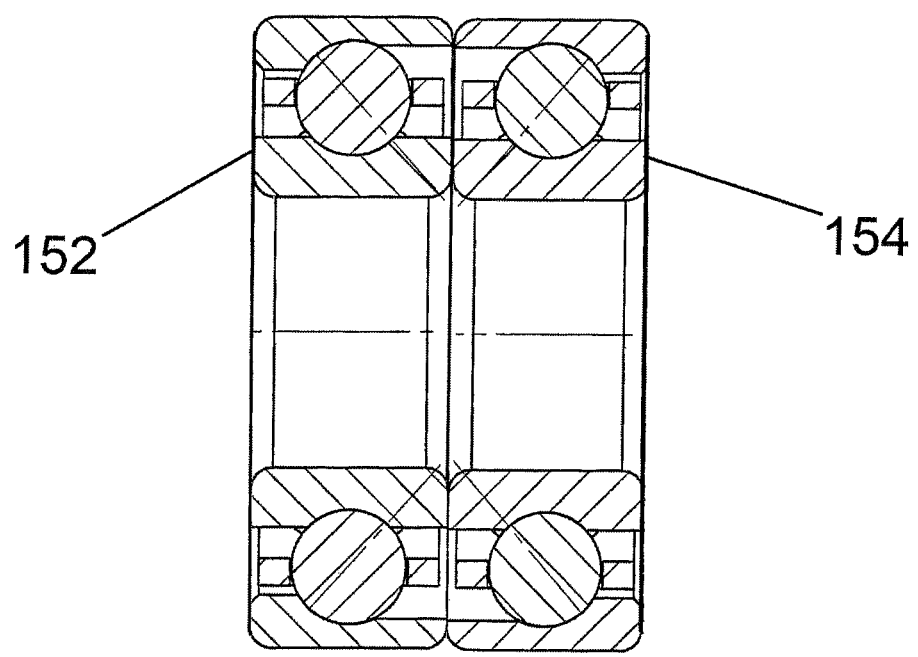

As shown in FIGS. 7A and 7B, the first and second angular contact bearings 152, 154 are configured to bear opposing loads relative to one another, either in what is commonly known as an "O" configuration (FIG. 7A) or an "X" configuration (FIG. 7B). In an "O" configuration, the first and second angular contact bearings 152, 154 are positioned back to back such that the opposing angles of contact of the bearing set converge toward the outer race but diverge toward the inner race as shown in FIG. 7A. In an "X" configuration, the first and second angular contact bearings 152, 154 are positioned face to face such that the opposing angles of contact of the bearing set diverge toward the outer race but converge toward the inner race as shown in FIG. 7B. It should be noted that typically the "O" configuration is used. However, with either configuration, the first and second angular contact bearings 152, 154 together are able to share and dissipate radial and axial (i.e., thrust) loads, caused by the rotation and movement of the shaft 124, in all directions. In particular, the opposing arrangement of the angular contact bearings 152, 154 dramatically increases the thrust capacity of the bearing system and eliminates the need for a thrust bearing in the turbocharger assembly 100 at the second bore end 134.

The fit between the turbine shaft 124, the housing 130, and other components may be such that a lubricating fluid, such as a film of pressurized oil (i.e., a squeeze-film damper), can be disposed between the components thereof. For instance, the fit between the shaft 124, the annular journal bearing 158, and the housing 130 may be such that a fluid can be disposed therebetween. During operation, as the shaft 124 rotates and vibrates, it compress the fluid between the shaft 124 and the annular journal bearing 158. In response, the viscous drag of the fluid resists the movement of the shaft 124, buffers the shaft 124 from the inner surface of the annular journal bearing 158, and enables the annular journal bearing 158 to rotate with a different rotational velocity than the shaft 124. At least partially because of the fluid, the annular journal bearing 158 is effectively cushioned and substantially spaced from the shaft 124. Likewise, the fit between the annular journal bearing 158 and the housing 130 may be such that a fluid can be disposed therebetween. As the annular journal bearing 158 rotates in response to the shaft 124 and viscous drag of the fluid, the fluid resists the movement of the annular journal bearing 158, buffers the annular journal bearing 158 from the inner surface of the housing 130, and enables the annular journal bearing 158 to rotate relative to the stationary housing 130. At least partially because of the fluid, the annular journal bearing 158 is effectively cushioned and substantially spaced from the housing 130. The combined effect of the interaction between the system components and the lubricating fluid is that the shaft 124 experiences viscous damping and consequently remains substantially aligned.

Furthermore, the fit between the turbine shaft 124, the first and second angular contact bearings 152, 154, and the housing 130 (or, alternatively the bearing sleeve 156) may be such that a lubricating fluid, such as a film of pressurized oil, can be disposed therebetween. During operation, as the shaft 124 rotates and vibrates, it compress the fluid between the shaft 124 and the inner races 152*b*, 154*b*. In response, the viscous drag of the fluid resists the movement of the shaft 124, buffers the shaft 124 from the inner races 152*b*, 154*b*, and enables the inner races 152*b*, 154*b* to rotate with different rotational velocities than the shaft 124. At least partially because of the fluid, the first and second angular contact bearings 152, 154 are effectively cushioned and substantially spaced from the shaft 124. In like manner, the fluid provides similar spacing and damping effects to the relative motions of the inner races 152*b*, 154*b*, the ball bearings 152*c*, 154*c*, the outer races 152*a*, 154*a*, and the housing 130, thereby enabling the inner races 152*b*, 154*b*, the ball bearings 152*c*, 154*c*, and the outer races 152*a*, 154*a* to each rotate with different angular velocities relative to one another. At the interface between the outer races 152*a*, 154*a* and the housing 130, the fluid enables the outer races 152*a*, 154*a* to rotate relative to the stationary housing 130. At least partially because of the fluid, the first and second angular contact bearings 152, 154 are effectively cushioned and substantially spaced from the housing 130 (or, alternatively the bearing sleeve 156) and the shaft 124. The combined effect of the interaction between the components of the assembly 100 and the lubricating fluid is that the shaft 124 experiences viscous damping and consequently remains substantially aligned.

Viscous damping is beneficial to the durability of the turbine shaft 124 and bearing system, particularly because the turbine shaft 124 may whirl, gyrate, oscillate, and the like during operation, which creates vibrations that are transferred throughout the turbocharger assembly 100. Consequently, the bearing system is configured to operate with the turbine shaft 124 and the lubricating fluid to dampen vibrations that arise from slight imbalances in the mass distribution of turbine 120 spinning at high speed, including imbalances that develop due to wear over time. In addition, the reduced relative rotational velocities between the turbine shaft 124, the bearing system, and the housing 130 have the effect of reducing frictional wear of the turbocharger system 100. Typically, to accomplish these benefits, a lubricating fluid may be in continuous supply to the space between the bearing system and housing 130 during operation through various conduits and passages. In at least one embodiment according to the present disclosure as shown in FIG. 1, housing 130 may include one or more conduits 190 connecting the housing opening 135 and the space between the housing 130 and bearing system. The fluid discussed herein may include any type of suitable fluid, including a pressurized oil.

Figure 10:
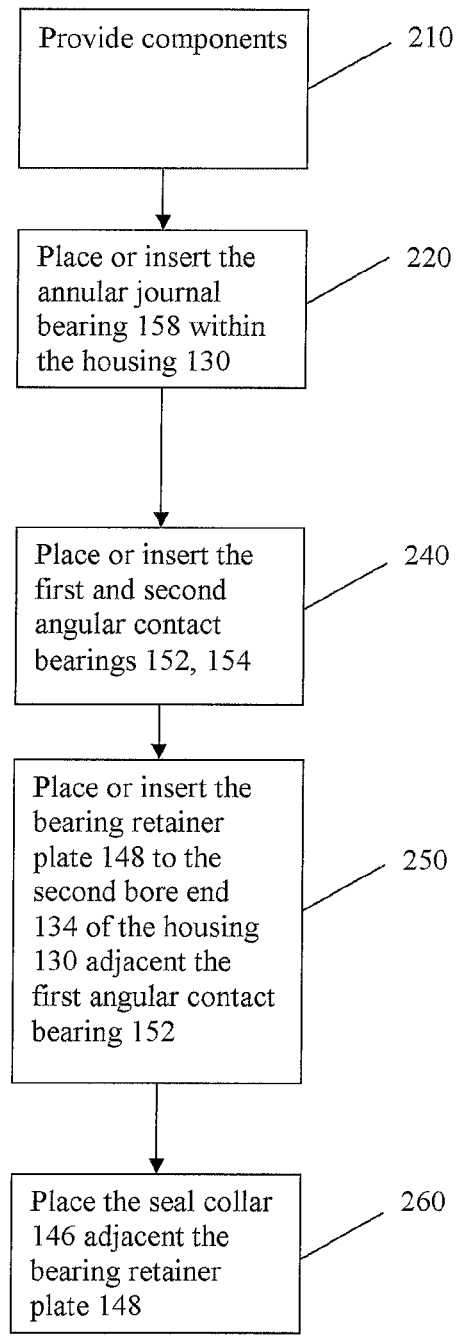
FIG. 10 is a flow diagram of a method for creating a cost effective high thrust capacity turbocharger assembly, according to at least one embodiment of the present disclosure.

A method of assembling a turbocharger 200 according to one embodiment of the present disclosure is shown in FIG. 10. The method 200 includes the step 210 of providing the housing 130, the standard production annular journal bearing 158, the standard production first and second angular contact bearings 152, 154, the bearing retainer plate 148, and the seal collar 146. The method 200 also includes the step 220 of placing or inserting the annular journal bearing 158 adjacent to the first bore end 132 within the housing 130 and the step 240 of placing or inserting the first and second angular contact bearings 152, 154 into the housing 130 adjacent the second bore end 134 in either an "O" or "X" configuration as described above. The method 200 also includes the step 250 of placing and securing the bearing retainer plate 148 to the second bore end 134 of the housing 130 adjacent the first angular contact bearing 152 by any suitable means, such as metal screws. The method 200 also includes the step 260 of placing the seal collar 146 adjacent the bearing retainer plate 148. The annular journal bearing 158, the first and second angular contact bearings 152, 154, the bearing retainer plate 148, and the seal collar 146 may be typically substantially centered on the longitudinal axis between the first bore end 132 and the second bore end 134 of the housing 130 such that the bearing system is substantially aligned with the housing cavity 136.

The turbocharger assembly 100 of the present disclosure may be developed from the initial product development stage or created by retrofitting an existing turbocharger. For turbochargers already built with custom-designed and manufactured bearings, in circumstances where repair or replacement is needed, it may be cost-effective to modify certain components of an existing turbocharger and replace the original bearing system with the bearing system of the present disclosure, which uses the standard production annular journal bearing 158 and the standard production first and second angular contact bearings 152, 154.

Figure 8B:
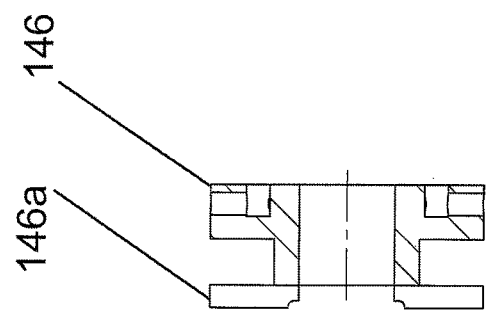
FIGS. 8A and 8B show axial and cross-sectional views of a modified seal collar, according to at least one embodiment of the present disclosure.
Figure 8A:
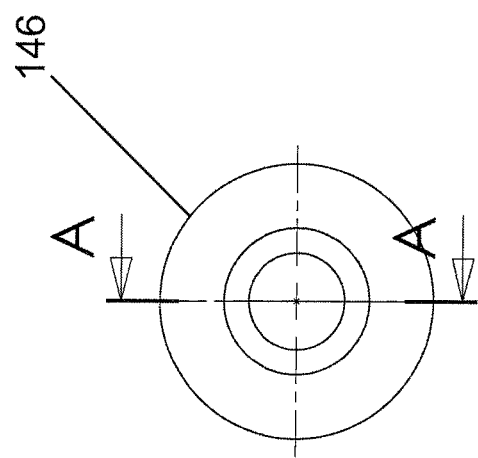
Figure 9B:
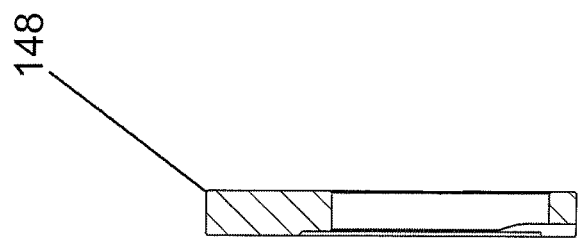
FIGS. 9A and 9B show axial and cross-sectional views of a bearing retainer plate, according to at least one embodiment of the present disclosure.
Figure 9A:
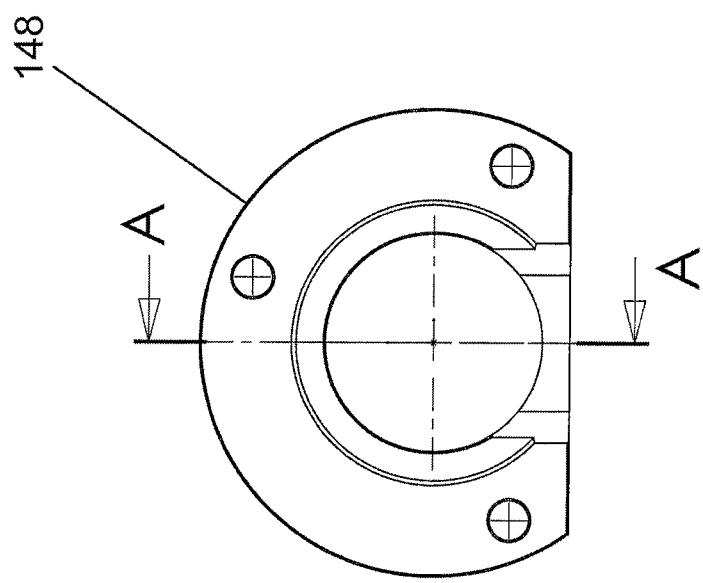

To implement reconditioning of an existing turbocharger in at least one embodiment according to the present disclosure, the turbine shaft 124 may require modification by removing material 124a from the shaft 124 to adapt it to the standard production first and second angular contact bearings 152, 154, as shown in FIG. 3. Moreover, modification may be required to the housing 130 to accommodate the standard production annular journal bearing 158 and the bearing sleeve 156. For instance, as shown in FIG. 2B, some portion 136a of the housing cavity 136 may need to be enlarged to accommodate the bearing sleeve 156 with the first and second angular contact bearings 152, 154. Typically, the bearing sleeve 156 may be included where the housing 130 of the particular assembly to be reconditioned is not sufficiently strong (i.e., material thickness) to support the new angular contact bearings 152, 154. Likewise, the second bore end 134 may require modification to accommodate a bearing retainer plate 148 and seal collar 146. Furthermore, as shown in FIGS. 8A and 8B, the seal collar 146 may require modification by removing material 146a that formally functioned as a thrust collar. As shown in FIGS. 9A and 9B, the bearing retainer plate 148 may be required to secure the bearing sleeve 156 and to address thrust loads that the first and second angular contact bearings 152, 154 must transfer to the housing 130.

The modifications to the turbine shaft 124, housing 130, and seal collar 146 may be made by any suitable process, such as grinding, using a lathe, or machining on a mill using computational numerical control. By modifying these components as described above and substituting the bearing system of the present disclosure for the original, as-manufactured, expensive bearing system, the original turbocharger may be reconditioned at significantly lower cost than replacement of either the original bearing components or the entire turbocharger.

The cost to recondition an existing turbocharger may be further affected by the selection of material for the plurality of ball bearings 152d, 154d. As described above, the plurality of ball bearings 152d, 154d may be made of steel, stainless steel, chrome steel, plastic, silicon nitride, ceramic, hybrid ceramic, or other material with suitable strength, surface, and wear properties. However, materials like hybrid ceramic, which have superior heat resistance, are more expensive than materials like stainless steel, having lesser heat resistance. Because the angular contact bearings 152, 154 have been positioned away from the turbine 120 at the second bore end 134, the ball bearing material may be selected from a group of lower cost materials with lesser heat resistance, such as stainless steel. Likewise, the other bearing components, such as the inner and outer races 152b, 154b, 152a, 154a and the retaining rings 152c, 154c may be of lesser heat resistant and less expensive materials. Therefore, the overall cost of the bearing system of the present disclosure is typically less than the original, as-manufactured bearing system in a turbocharger.

Figure 11:
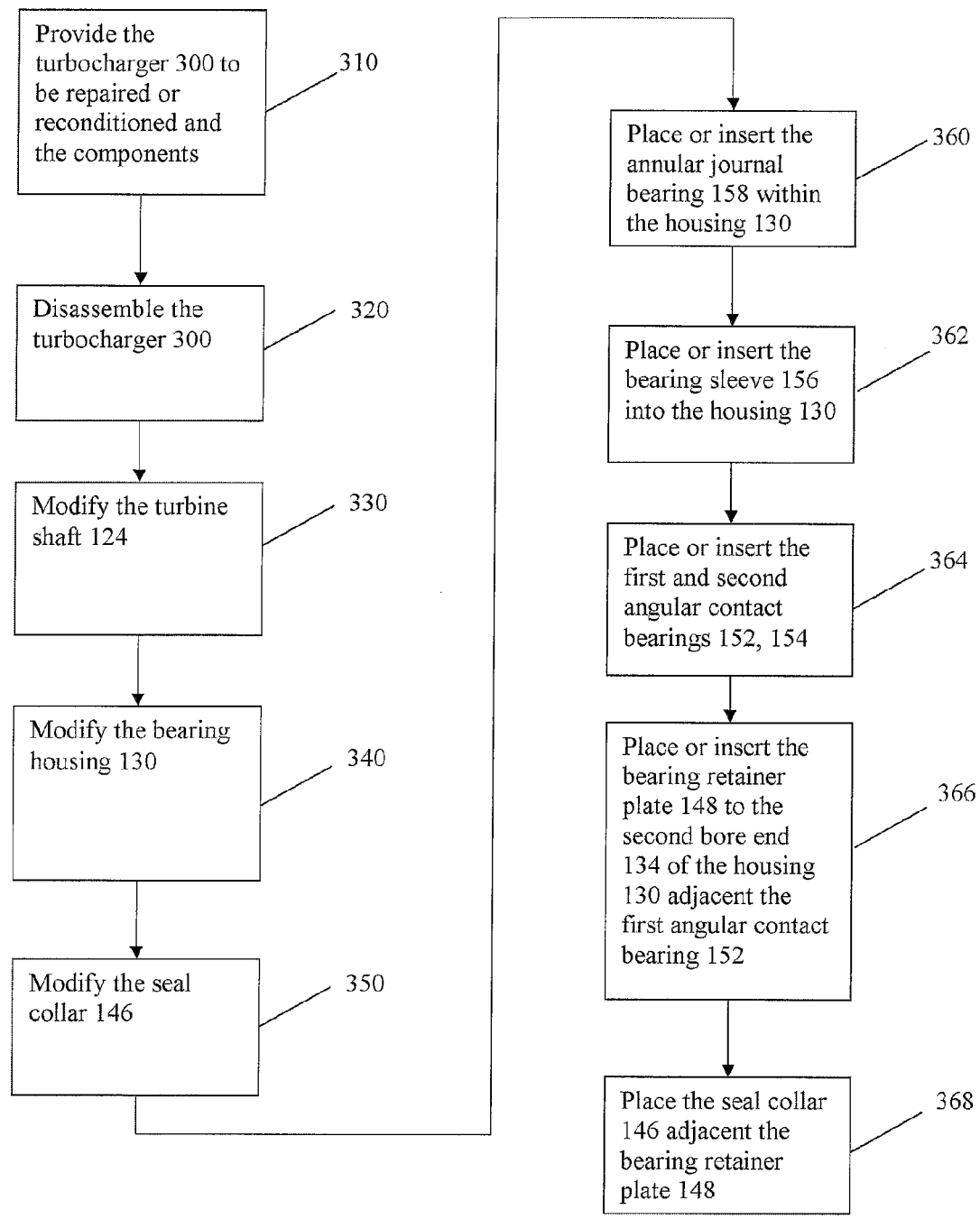
FIG. 11 is a flow diagram of a method for improving a journal bearing turbocharger assembly, according to at least one embodiment of the present disclosure.

A method of reconditioning a turbocharger 300 according to one embodiment of the present disclosure is shown in FIG. 11. The method 300 includes the step 310 of providing the turbocharger 300 to be reconditioned, the standard production annular journal bearing 158, the standard production first and second angular contact bearings 152, 154, the bearing sleeve 156, and the bearing retainer plate 148. The method 300 includes the step 320 of at least partially disassembling the turbocharger 300 to be reconditioned and the step 330 of modifying the turbine shaft 124 of turbocharger 300 to accept the standard production annular journal bearing 158 and standard production first and second angular contact bearings 152, 154. The method 300 includes the step 340 of modifying the bearing housing 130 of turbocharger 300 as needed to accept the standard production annular journal bearing 158 and bearing sleeve 156 and the step 350 of modifying the seal collar 146 of turbocharger 300 to remove its thrust bearing portions.

As shown in FIG. 11, the method 300 also includes the step 360 of placing or inserting the annular journal bearing 158 within the housing 130 and the step 362 of placing or inserting the bearing sleeve 156 into the housing 130 and the step 364 of placing or inserting the first and second angular contact bearings 152, 154 into the bearing sleeve 156 in either an "O" or "X" configuration as described above. The method 300 further includes the step 366 of placing and securing the bearing retainer plate 148 to the second bore end 134 of the housing 130 adjacent the first angular contact bearing 152 by any suitable means, such as metal screws and the step 368 of placing the seal collar 146 adjacent the bearing retainer plate 148. In at least one embodiment, the annular journal bearing 158, the first and second angular contact bearings 152, 154, the bearing sleeve 156, the bearing retainer plate 148, and the seal collar 146 are substantially centered on the longitudinal axis between the first bore end 132 and the second bore end 134 of the housing 130 such that the bearing system is substantially aligned with the housing cavity 136.

While various embodiments of a cost effective high thrust capacity turbocharger assembly have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

What is claimed is:

1. An assembly for a turbocharger having a turbine and a compressor, the assembly comprising:

a bearing housing comprising a substantially cylindrical bore having a longitudinal axis, a first bore end, a second bore end, and a housing cavity extending through the bearing housing between the first bore end and the second bore end;

a bearing assembly disposed within the housing cavity comprising:

an annular rotating journal bearing positioned concentrically within the housing cavity adjacent the first bore end;

a first angular contact bearing positioned concentrically within the housing cavity adjacent the second bore end, the first angular contact bearing comprising:

a first bearing outer race and a first bearing inner race, the first bearing outer race and the first bearing inner race configured to accommodate a plurality of first bearing elements therebetween and to resist axial loads in a first direction along the longitudinal axis of the bearing housing, the first bearing outer race having a first bearing outer race axial surface and the first bearing inner race having a first bearing inner race axial surface;

a second angular contact bearing positioned concentrically within the housing cavity adjacent the first angular contact bearing, the second angular contact bearing comprising:

a second bearing outer race and a second bearing inner race, the second bearing outer race and the second bearing inner race configured to accommodate a plurality of second bearing elements therebetween and to resist axial loads in a second direction along the longitudinal axis of the bearing housing, wherein the second direction is opposite the first direction;

a bearing retainer plate interposed between the first angular contact bearing and the compressor having an axially-facing surface in contact with the first bearing outer race axial surface for transmitting an axial thrust load to the bearing housing; and a seal collar interposed between the bearing retainer plate and the compressor having an axially-facing surface in contact with the first bearing inner race axial surface for transmitting an axial thrust load to the bearing housing;

wherein the bearing housing and bearing assembly are configured to receive a shaft and together dampen axial and radial loads in all directions from said shaft.

2. The assembly of claim 1, further comprising the shaft extending longitudinally through the bearing housing, wherein the turbine is disposed at the first bore end and the compressor is disposed at the second bore end.

3. The assembly of claim 1, further comprising a bearing sleeve interposed between the bearing housing and the first bearing outer race and the second bearing outer race.

4. The assembly of claim 1, wherein the plurality of first bearing elements comprises metallic or plastic balls.

5. The assembly of claim 4, wherein the plurality of second bearing elements comprises metallic or plastic balls.

6. The assembly of claim 1, wherein the first bearing outer race and the first bearing inner race comprise metal or plastic.

7. The assembly of claim 6, wherein the second bearing outer race and the second bearing inner race comprise metal or plastic.

8. A method of creating an assembly of a turbocharger having a turbine and a compressor for resisting loads caused by a shaft of the turbocharger, the method comprising:

providing a bearing housing comprising a substantially cylindrical bore having a longitudinal axis, a first bore end, a second bore end, and a housing cavity extending through the bearing housing between the two bore ends;

placing an annular journal bearing within the housing cavity adjacent to the first bore end;

placing a first angular contact bearing within the housing cavity adjacent to the second bore end, wherein the first annular contact bearing comprises a plurality of first bearing elements and a first bearing outer race having a first bearing outer race axial surface;

placing a second angular contact bearing within the housing cavity adjacent to the first angular contact bearing such that the first and second angular contact bearings are opposing to each other, wherein the second angular contact bearing comprises a plurality of second bearing elements and a second bearing inner race having a second bearing inner race axial surface; and placing a bearing retainer plate and a seal collar adjacent the second bore end of the bearing housing such that the first and second angular contact bearings are at least partially retained within the housing cavity of the bearing housing by the bearing housing, the bearing retainer plate, and the seal collar, wherein the bearing retainer plate is interposed between the first angular contact bearing and the compressor and includes an axially-facing surface in contact with the first bearing outer race axial surface for transmitting an axial thrust load to the bearing housing, and the seal collar is interposed between the bearing retainer plate and the compressor and includes an axially-facing surface in contact with the first bearing inner race axial surface for transmitting an axial thrust load to the bearing housing.

9. The method of claim 8, wherein the plurality of first bearing elements comprises metallic or plastic bearing balls.

10. The method of claim 9, wherein the plurality of second bearing elements comprises metallic or plastic bearing balls.

11. The method of claim 8, wherein the first angular contact bearing comprises metal or plastic.

12. The method of claim 11, wherein the second angular contact bearing comprises metal or plastic.

13. A method of improving an existing journal bearing turbocharger, the method comprising:

providing a journal bearing turbocharger comprising:

a bearing housing comprising a substantially cylindrical bore having a longitudinal axis, a first bore end, a second bore end, and a housing cavity extending through the bearing housing between the two bore ends;

a rotating shaft extending longitudinally through the bearing housing and comprising a turbine at the first bore end and a compressor at the second bore end;

a first annular journal bearing positioned within the housing cavity adjacent to the first bore end;

a thrust bearing positioned within the housing cavity adjacent to the second bore end;

a second annular journal bearing positioned within the housing cavity between the first annular journal bearing and the thrust bearing;

a thrust washer positioned within the housing cavity in contact with the thrust bearing and between the thrust bearing and the second annular journal bearing;

a seal collar positioned adjacent the second bore end of the bearing housing such that a first angular contact bearing and a second angular contact bearing are retained within the housing cavity of the bearing housing by the bearing housing, a bearing retainer plate, and the seal collar;

removing the thrust bearing, the second annular journal bearing, and the thrust washer from the journal bearing turbocharger;

modifying the bearing housing, the rotating shaft, and the seal collar such that the first angular contact bearing, the second angular contact bearing, a bearing sleeve, and the bearing retainer plate may be positioned within the turbocharger where the thrust bearing, second annular journal bearing, and thrust washer were previously positioned in the turbocharger, wherein each of the first and second angular contact bearings comprises metallic or plastic ball bearings, the first angular contact bearing including a first bearing outer race having a first bearing outer race axial surface and a first bearing inner race having a first bearing inner race axial surface;

placing the first angular contact bearing within the bearing sleeve;

placing the second angular contact bearing within the bearing sleeve adjacent to the first angular contact bearing such that the first and second angular contact bearings oppose each other;

placing the bearing sleeve within the bearing housing adjacent to the second bore end;

placing the bearing retainer plate adjacent the second bore end of the bearing housing such that the first and second angular contact bearings are at least partially retained within the housing cavity of the bearing housing, the bearing retainer plate being interposed between the first angular contact bearing and the compressor and including an axially-facing surface in contact with the first bearing outer race axial surface for transmitting an axial thrust load to the bearing housing; and placing the seal collar adjacent the bearing retainer plate adjacent the second bore end of the bearing housing such that the first and second angular contact bearings are at least partially retained within the housing cavity of the bearing housing by the bearing housing, the bearing retainer plate, and the seal collar, the seal collar being interposed between the bearing retainer plate and the compressor and including an axially-facing surface in contact with the first bearing inner race axial surface for transmitting an axial thrust load to the bearing housing.

14. An assembly for a turbocharger, the assembly comprising:

a bearing housing comprising a substantially cylindrical bore having a longitudinal axis, a first bore end, a second bore end, and a housing cavity extending through the bearing housing between the first bore end and the second bore end; and a bearing assembly disposed within the housing cavity comprising:

an annular rotating journal bearing positioned concentrically within the housing cavity adjacent the first bore end;

a first angular contact bearing positioned concentrically within the housing cavity adjacent the second bore end, the first angular contact bearing comprising:

a first bearing outer race and a first bearing inner race, the first bearing outer race and the first bearing inner race configured to accommodate a plurality of first bearing elements therebetween and to resist axial loads in a first direction along the longitudinal axis of the bearing housing;

a second angular contact bearing positioned concentrically within the housing cavity adjacent the first angular contact bearing, the second angular contact bearing comprising:

a second bearing outer race and a second bearing inner race, the second bearing outer race and the second bearing inner race configured to accommodate a plurality of second bearing elements therebetween and to resist axial loads in a second direction along the longitudinal axis of the bearing housing, wherein the second direction is opposite the first direction;

a bearing retainer plate interposed between the first angular contact bearing and the compressor having an axially-facing surface in contact with an adjacent axial surface of the first outer race for transmitting an axial thrust load to the bearing housing; and a seal collar interposed between the bearing retainer plate and the compressor having an axially-facing surface in contact with an adjacent axial surface of the first inner race for transmitting an axial thrust load to the bearing housing;

wherein the bearing housing and bearing assembly are configured to receive a shaft and together dampen axial and radial loads in all directions from said shaft, and at least one of the first bearing outer race and the second bearing outer race is substantially spaced from the bearing housing to rotate at a rotational velocity different than the bearing housing.

15. An assembly for a turbocharger having a turbine and a compressor, the assembly comprising:

a bearing housing comprising a substantially cylindrical bore having a longitudinal axis, a first bore end, a second bore end, and a housing cavity extending through the bearing housing between the first bore end and the second bore end;

a bearing assembly disposed within the housing cavity comprising:

an annular rotating journal bearing positioned concentrically within the housing cavity adjacent the first bore end;

a first angular contact bearing positioned concentrically within the housing cavity adjacent the second bore end, the first angular contact bearing comprising:

a first bearing outer race and a first bearing inner race, the first bearing outer race and the first bearing inner race configured to accommodate a plurality of first bearing elements therebetween and to resist axial loads in a first direction along the longitudinal axis of the bearing housing;

a second angular contact bearing positioned concentrically within the housing cavity adjacent the first angular contact bearing, the second angular contact bearing comprising:

a second bearing outer race and a second bearing inner race, the second bearing outer race and the second bearing inner race configured to accommodate a plurality of second bearing elements therebetween and to resist axial loads in a second direction along the longitudinal axis of the bearing housing, wherein the second direction is opposite the first direction;

a bearing retainer plate interposed between the first angular contact bearing and the compressor having an axially-facing surface in contact with an adjacent axial surface of the first outer race for transmitting an axial thrust load to the bearing housing; and a seal collar interposed between the bearing retainer plate and the compressor having an axially-facing surface in contact with an adjacent axial surface of the first inner race for transmitting an axial thrust load to the bearing housing;

wherein the bearing housing and bearing assembly are configured to receive a shaft and together dampen axial and radial loads in all directions from the shaft, and at least one of the first bearing inner race and the second bearing inner race is substantially spaced from the shaft to rotate at a rotational velocity different than the shaft.

\* \* \* \* \*